United States Patent [19]

Machida et al.

[11] Patent Number: 5,065,150

[45] Date of Patent: Nov. 12, 1991

[54] MONITORING APPARATUS FOR DISASTER PREVENTION

[75] Inventors: Haruchika Machida, Sagamihara; Yoshiaki Fuwa, Yokohama; Takashi Shimokawa, Sagamihara, all of Japan

[73] Assignee: Hochiki Corp., Tokyo, Japan

[21] Appl. No.: 380,197

[22] Filed: Jul. 14, 1989

[30] Foreign Application Priority Data

Jul. 29, 1988 [JP] Japan ............................... 63-189728

[51] Int. Cl.[5] ................................................ H04B 3/00

[52] U.S. Cl. .......................... 340/825.06; 340/825.15; 340/825.16

[58] Field of Search ...................... 340/825.06, 825.07, 340/825.08, 825.15, 825.16, 825.18, 825.52, 505, 506, 518, 531, 539; 365/226, 228, 195, 206

[56] References Cited

U.S. PATENT DOCUMENTS 4,638,313 1/1987 Sherwood, Jr. et al. ...... 340/825.06
4,772,876 9/1988 Laud .................................. 340/506
4,847,593 7/1989 Igarashi .............................. 340/506
4,849,942 7/1989 Farrugia ............................. 365/228

*Primary Examiner*—Donald J. Yusko
*Assistant Examiner*—Dervis Magistre

[57] ABSTRACT

Disclosed is a monitoring apparatus for disaster prevention which allows the setting of relay unit data to be revised with ease by effectively utilizing the information transmitting function between the receiver and the relay units. The monitoring apparatus for disaster prevention comprises relay units equipped with a storage device.

6 Claims, 5 Drawing Sheets

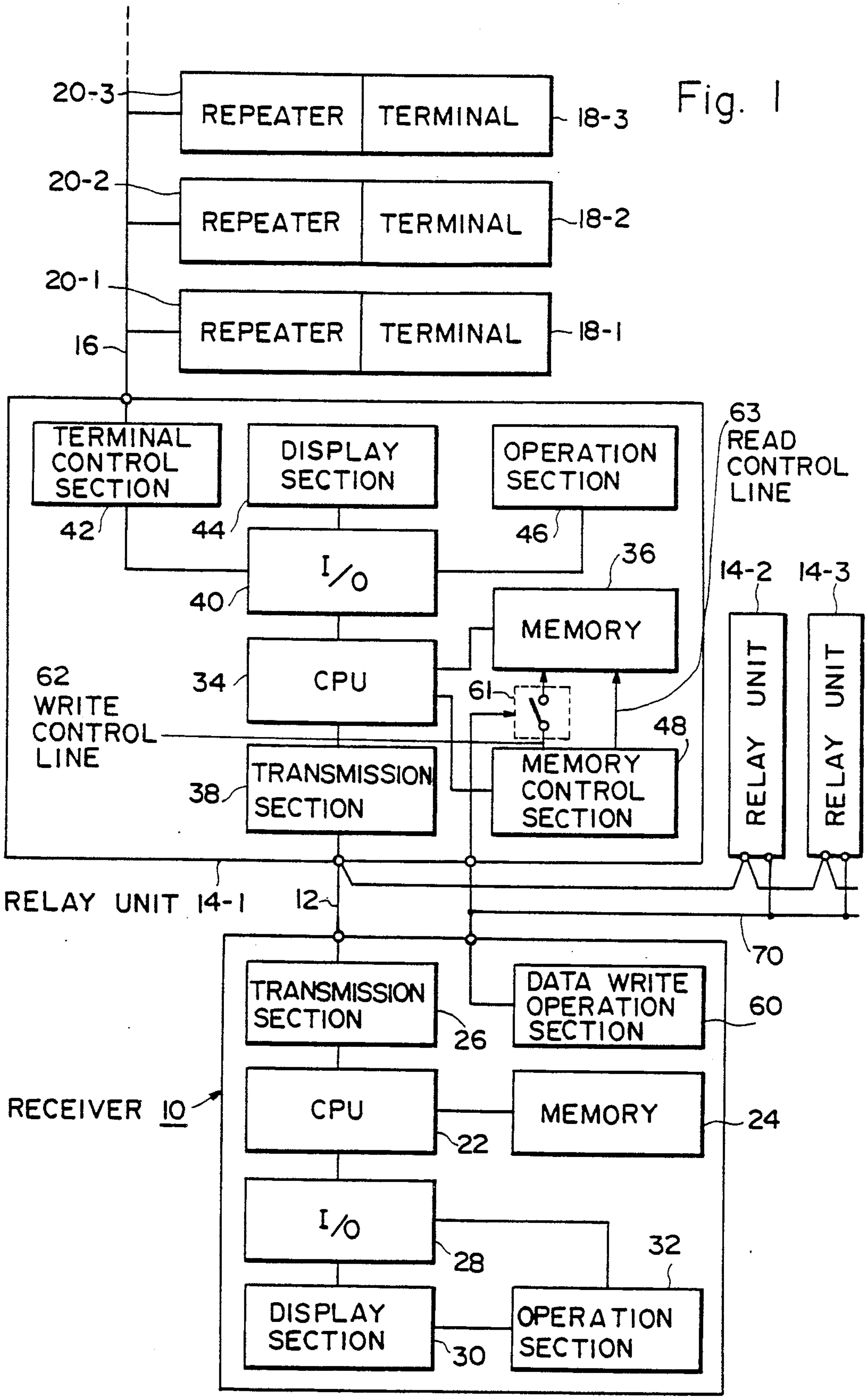
Fig. 1
REPEATER
TERMINAL
REPEATER
TERMINAL
REPEATER
TERMINAL
20-3
20-2
20-1
18-3
18-2
18-1
16
TERMINAL CONTROL SECTION
DISPLAY SECTION
OPERATION SECTION
63 READ CONTROL LINE
42
44
46
36
I/O
40
MEMORY
14-2
14-3
RELAY UNIT
RELAY UNIT
62 WRITE CONTROL LINE
34
CPU
61
48
TRANSMISSION SECTION
MEMORY CONTROL SECTION
38
RELAY UNIT 14-1
12
70
TRANSMISSION SECTION
DATA WRITE OPERATION SECTION
60
26
RECEIVER 10
CPU
MEMORY
24
22
I/O
28
32
DISPLAY SECTION
OPERATION SECTION
30

20-3
20-2
20-1
16
REPEATER
TERMINAL
18-3
18-2
18-1
TERMINAL CONTROL SECTION
42
DISPLAY SECTION
44
OPERATION SECTION
46
I/O
40
36
MEMORY
CPU
MEMORY
50
34
TRANSMISSION SECTION
38
48
MEMORY CONTROL SECTION
14-2
14-3
RELAY UNIT
RELAY UNIT 14-1
12
TRANSMISSION SECTION
26
22
24
CPU
MEMORY
RECEIVER 10
28
I/O
32
30
DISPLAY SECTION
OPERATION SECTION

MONITORING APPARATUS FOR DISASTER PREVENTION

BACKGROUND OF THE INVENTION

1. Field of the Invention

This invention relates to a monitoring apparatus for disaster prevention which is adapted to perform, by means of a receiver, centralized control of relay units for monitoring terminals with equipment.

2. Description of the Related Art

In a conventional monitoring apparatus for disaster prevention which is known as a distributed disaster-prevention monitoring system, one or a plurality of relay units are connected to a receiver, each relay unit being connected to a plurality of terminals with equipment, such as sensors and disaster prevention devices. Each relay unit monitors and controls these terminals with equipment. Information exchange between the relay unit(s) and the receiver allows the monitoring information obtained from the relay unit(s) to be gathered, the remote control of the disaster prevention devices to be performed, etc.

More specifically, a relay unit is installed on each floor of the building concerned, and monitors and controls the sensors and disaster prevention devices provided on that floor. If the receiver is down, each relay unit can individually conduct the monitoring and control for the floor concerned.

For this purpose, relay unit data for monitoring and controlling the terminals with equipment on each floor is set and stored in each relay unit. This relay unit data may consist, for example, of region bell ringing matrix data, anti-smoke-emission interlocking matrix data, accumulation/non-accumulation setting data, etc.

Such relay unit data is usually stored in an ROM provided in a relay unit. When shipping the relay unit, this relay unit data is stored in the associated ROM beforehand in accordance with basic specifications. Accordingly, it often happens that the relay unit data is not in conformity with the terminal equipment installation condition on the actual installation site as a result of a design change, etc. In such cases, the relay unit data must be revised on the installation site. And so in this conventional monitoring apparatus for disaster prevention, the accuracy of the relay unit data is required, because a error of the relay unit data causes a matter of life and death.

When thus revising ROM data (relay unit data) on an installation site, it is necessary to go to the place where the relay unit is to be installed and replace the existing ROM by a new ROM to which new relay unit data has been written using an ROM writer or the like.

In conventional apparatuses for disaster prevention, the operation of revising relay unit data is rather troublesome since a revision of data can only be effected by going to the respective relay units installed on the different floors of the building concerned. Furthermore, frequent changes in partitions and equipment are generally made during the period between the installation of the monitoring apparatus for disaster prevention and the completion of the building, and the relay unit data must be revised each time such a change is made, a circumstance which makes the operation of revising the relay unit data still more troublesome. In addition, there is a problem that an accuracy of the revised relay unit data is not guaranteed.

SUMMARY OF THE INVENTION

This invention has been contrived in view of the problem mentioned above. It is accordingly an object of this invention to provide a monitoring apparatus for disaster prevention in which the function of exchanging information between the receiver and the relay unit(s) is effectively utilized for the purpose of allowing the relay unit data to be revised with ease.

In order to achieve this object, the present invention provides a monitoring apparatus for disaster prevention, comprising: one or a plurality of relay units equipped with a storage means allowing rewriting of data and a control section for monitoring a plurality of terminals with equipment on the basis of data stored in the storage means; a receiver having a storage means, connected to the relay units over transmission lines and adapted to monitor and control the relay units by transmitting information based on the data stored in the storage means thereof; data transfer/writing means for transferring and writing relay unit data previously stored in the storage means of the receiver to the storage means of the relay units over the transmission lines; and a data checking means for reading the data written to the storage means of the relay units by the data transfer/writing means and transmitting it through the transmission lines to the receiver and checking to see whether the relay unit data previously stored in the storage means of said means is in accordance with the data written to the storage means of said relay units.

In accordance with another aspect of this invention, there is provided a monitoring apparatus for disaster prevention, comprising: one or a plurality of relay units equipped with a storage means allowing rewriting of data and a control section for monitoring a plurality of terminals and equipment on the basis of data stored in the storage means; a receiver having a storage means, connected to the relay units over transmission lines and adapted to monitor and control the relay units by transmitting information based on the data stored in the storage mean thereof; data transfer/writing means for transferring and writing relay unit data previously stored in the storage means of the receiver to the storage means of the relay units over the transmission lines; and a data checking means for transferring relay unit data previously stored in the storage means of the receiver to the relay units and checking to see whether the relay unit data is in accordance with the data written to the storage means of the relay units.

With the monitoring apparatus for disaster prevention of this invention having the above-described construction, the relay unit data can be transferred from the receiver to the relay unit(s) and written to the storage means of the relay units(s), i.e., down loading of the relay unit data can be effected, so that the relay unit data can always be revised solely by rewriting the relay unit data as stored in the storage means of the receiver, there being no need to go to the relay units installed on the respective floors of the building concerned each time the revision of relay unit data is to be performed. Thus, the monitoring apparatus of this invention allows the relay unit data to be revised more easily and more efficiently.

Furthermore, the apparatus allows the relay unit data to be checked after the transfer/writing of data from the receiver to the relay units has been completed. The data check can be effected by reading the relay unit data an transferring it to the receiver, and then collating it with the original data. Thus, the reliability of the relay unit data which has been transferred and written to the relay units can be guaranteed.

In the case of a large building, in particular, which usually requires frequent changes in partitions and equipment before it is completed, this apparatus provides a great advantage in terms of execution since it allows the relay unit data to be revised with ease at the receiver.

In a preferable form of this invention, the receiver is equipped with a display means which serves to display any errors in the data written to the storage means of the relay units whenever the data checking means detects any discordance in the data.

In another preferable form of this invention, the relay units are equipped with a transmission means for transmitting to the receiver a data error signal indicating an error in the data written to the storage means of the relay units whenever the data checking means detects any discordance in the data, and, at the same time, the receiver is equipped with a display means for displaying any error in the data written to the storage means of the relay units whenever it receives the data error signal.

Further, the apparatus of this invention may be equipped with a write inhibit switch for inhibiting the writing of data to the storage means of the relay units. This write inhibit switch may be operated remotely by an operating means provided in the receiver.

BRIEF DESCRIPTION OF THE DRAWINGS

FIG. 1 is a block diagram of an embodiment of this invention;

DETAILED DESCRIPTION OF THE PREFERRED EMBODIMENTS

Figure 2:
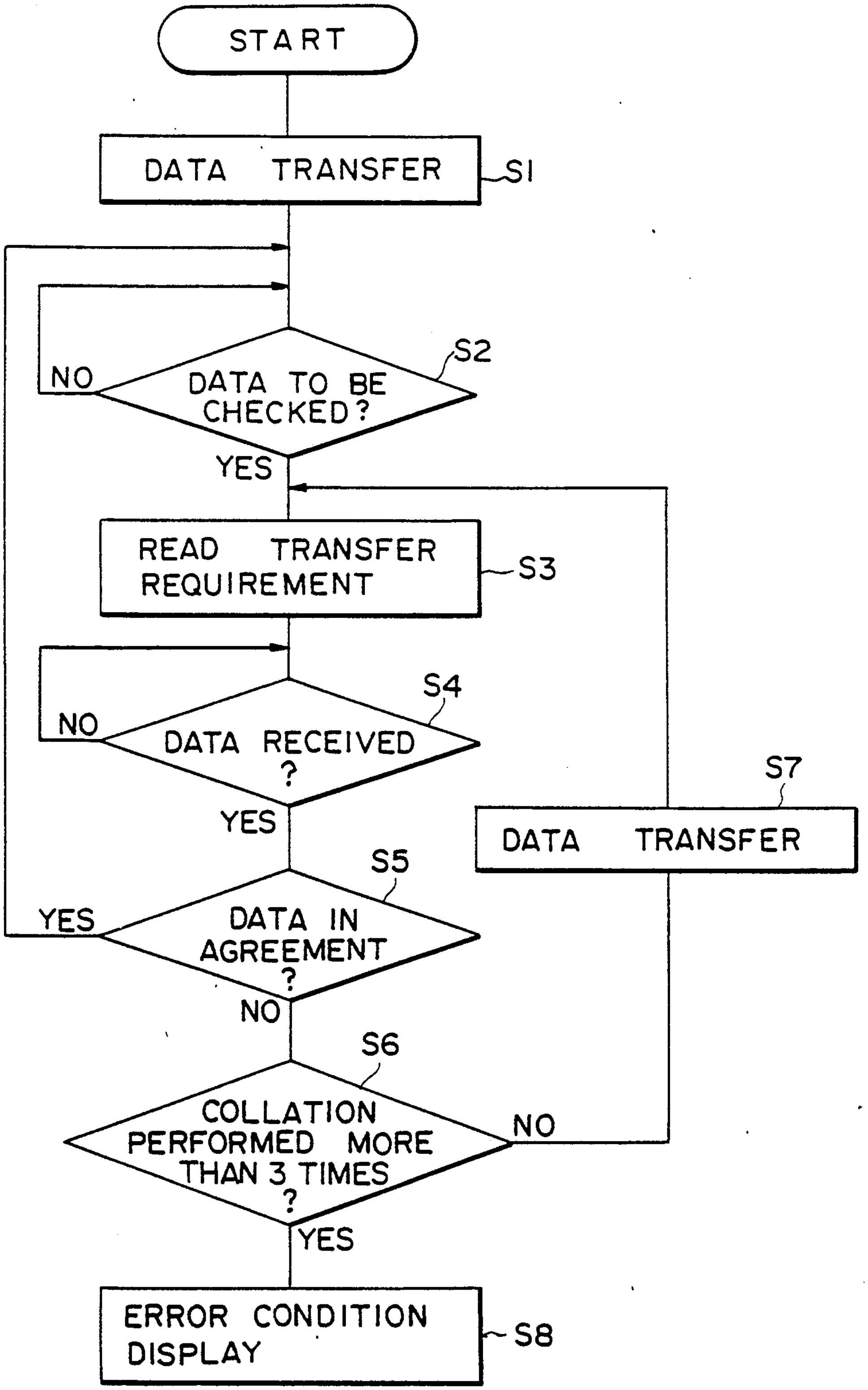
FIG. 2 is a flowchart illustrating the processing operations in the embodiment shown in FIG. 1.

Preferred embodiments of this invention will now be described with reference to the accompanying drawings.

FIG. 1 is a block diagram showing an embodiment of this invention. The embodiment shown includes a receiver 10, transmission lines 12, and a plurality of relay units 14-1, 14-2, 14-3, . . . connected to the receiver 10 through the transmission lines 12. As shown with respect to 14-1, each of the relay units 14-1, 14-2, 14-3, . . . is connected to a plurality of terminals with equipment 18-1, 18-2, 18-3, . . . through a signal line 16 and respective repeaters 20-1, 20-2, 20-3, . . . The terminals with equipment 18-1, 18-2, 18-3, . . . may consist of sensors such as fire detectors or disaster prevention devices such as fire door dampers.

The receiver 10 comprises a CPU 22, a memory 24, a transmission section 26, an I/O (input/output section) 28, a display section 30, and an operation section 32.

Stored in the memory 24 is control data for monitoring and controlling the relay units 14-1, 14-2, 14-3, . . . In accordance with this invention, the memory 24 further includes areas for storing relay unit data to be used in the relay units 14-1, 14-2, 14-3, . . . Specifically, the memory 24 may be an ROM which allows data rewriting (EEPROM: Electrically Erasable Programmable Read-Only Memory), etc.

The CPU 22 is equipped with a data transmission function. That is, it effects data exchange between the receiver 10 and the respective relay units 14-1, 14-2, 14-3, . . . in accordance with the control data which is stored in the memory 24 and which is used for monitoring and controlling these relay units through the transmission lines 12.

In accordance with this invention, the CPU 22 serves as a data transfer/writing means. When it receives a down-loading command with respect to any one of the relay units 14-1, 14-2, 14-3, . . . through manipulation of the operation section 32, the CPU 22 reads relay unit data from the corresponding relay unit data storage area secured in the memory 24, and transfers and writes the relay unit data thus read to the corresponding relay unit through the transmission lines 12.

The CPU 22 provided in the receiver of this invention also serves as a data checking means. When the data checking operation is performed through manipulation of the operation section 32 after the down loading of the relay unit data from the memory 24 to the relevant relay unit has been completed, the CPU 22 requires the specified relay unit to read and transfer the relay unit data, and checks the data transferred, in response to this read/transfer requirement, from the relay unit concerned, by collating it with the original data stored in the memory 24.

On the other hand, as shown with respect to the relay unit, each of the relay units 14-1, 14-2, 14-3, . . . is equipped with a CPU 34, a memory 36, a transmission section 38, an I/O 40, a terminal control section 42, a display section 44, and an operation section 46. Further, a memory control section 48 is provided for the memory 36. When, in interpreting a requirement command from the receiver 10, the CPU 34 identifies the data transfer/write requirement, the memory control section 48 sets the memory 36 in the condition allowing writing, the relay unit data transferred from the receiver 10 being written to the memory 36. When, in interpreting a requirement command from the receiver 10, the CPU 34 identifies the data transfer/write requirement, the memory control section 48 sets the memory 36 in the condition allowing reading, the relay unit data stored in the memory 36 being read and transferred to the receiver 10 through the CPU 34 and the transmission section 38.

The memory 36 provided in the relay unit 14-1 may be an ROM allowing rewriting, the memory control section 48 performing write enable or read-enable control with respect to the memory 36 in accordance with the interpretation command of the CPU 34.

Next, the processing operations of the receiver 10 in the embodiment shown in FIG. 1 will be described with reference to the flowchart of FIG. 2.

First, in the stage where the monitoring apparatus for disaster prevention of this invention has been installed on the installation site, the data necessary for monitoring and controlling the relay units by the receiver 10 is stored only in the memory 24 provided in the receiver 10.

Since the basic device specifications have been fixed at the time of shipping, it is naturally possible to previously store basic data in the respective memories 36 of the relay units 14-1, 14-2, 14-3, . . .

If it becomes necessary to revise the relay unit data after installation, the revision can be effected by rewriting the relevant relay unit data, for example, the relay unit data on the relay unit 14.1 stored in the memory 24 of the receiver 10. Since the memory 24 consists of ROM corresponding to the relay unit data on the respective relay units, the data revision can be effected by replacing the ROM corresponding to the relay unit whose relay unit data is to be revised, for example, the relay unit 14.1, by a new ROM to which the revised relay unit data has been written by means of an ROM writer of the like.

When the relay unit data o the relay unit 14.1 has been thus revised in the receiver 10, a down-loading command specifying the relay unit 14.1 is given through the I/O 28 to the CPU 22 through manipulation of the operation section 32. Upon receiving this down-loading command, the CPU 22 reads that portion of the relay unit data in the memory 24 which corresponds to the specified relay unit 14 1, and transfers it to this relay unit through the transmission section 26 and the transmission lines 12 (Step S1).

Figure 3:
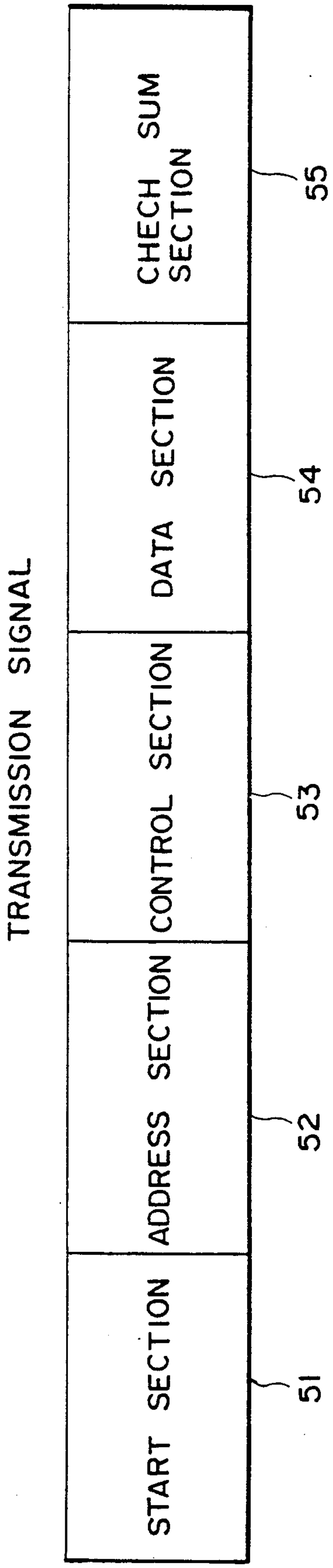
FIG. 3 is a diagram showing the frame construction of the data transmitted from the receiver to the relay units.

FIG. 3 shows the frame construction of the data transferred from the receiver 10 to the relay units 14-1, 14-2, 14-3, . . . The transferred data consists of a start section 51 indicating the data beginning, an address section 52 indicating the address of the relay unit to which it is to be transferred, a control section 53 for commands to be given to the relay units (e.g., writing instruction), a data section 54 constituting the relay unit data, and a check sum section 55 for detecting any errors in data transfer.

Each of the relay units 14-1, 14-2, 14-3, . . . checks the address section 52 of the data transferred from the receiver 10 to see whether its address is to be found there. If, for example, the relay unit 14.1 identifies its address in the transferred data, the CPU 34 associated with this relay unit interprets the command in the control section 53 of the data and conducts write-access to the memory control section 48, which causes the memory control section 48 to set the memory 36 in the write-enable condition, the relay unit data transmitted from the receiver 10 being written to the memory 36.

The data transfer from the receiver to the relay unit 14-1 is naturally effected in a predetermined data-length unit, the CPU 34 checking the transferred data to see whether it contains any errors. When the transferred data is found to be normal, it is written to the memory 36. If the CPU detects any error in the transferred data, it requires the receiver 10 to re-transfer the data.

On the other hand, it may happen that, after the down-loading from the receiver 10 to the relay unit 14-1 has been completed, the relay unit data stored in the memory 36 of the relay unit 14-1 is required to be checked on the side of the receiver 10. In that case, a data checking requirement is given to the CPU 22 through manipulation of the operation section 32 of the receiver 10 (Step S2). Such a checking requirement may be given to all the relay units at one time through a single operation, or only to particular specialized relay units.

Upon receiving this data checking requirement which is given through manipulation of the operation section 32, the CPU 22 requires the relay unit 14-1 to read and transfer the relay unit data(Step S3). The CPU 34 of the relay unit 14-1 then interprets this read/transfer requirement command from the receiver 10, and conducts read access to the memory control section 48, thereby setting the memory 36 in the read-enable condition. Then, the CPU 34 reads the relay unit data from the memory 36 in a predetermined data-length unit, and transfers it to the receiver 10.

Upon receiving the relay unit data from the relay unit 14-1 (Step S4), the CPU 22 of the receiver 10 checks the relay unit data, which is transferred from the relay unit 14-1 in a predetermined data-length unit, by collating it with the original data stored in the memory 24 (Step S5).

If the data transferred from the relay unit 14-1 is not in accordance with the original data, the number of data collating operations performed is counted (Step S6). If the number does not exceed a predetermined value (which is 3 in this embodiment), the relay unit data to be re-transferred to the memory 34 from the memory 24 (Step S7), and the procedure between step S3 and step S6 are repeated. If the collating operation has been performed three times or more, i.e., if the transferred data is not in accordance with the original data even after a number of data checking operations, an error display is effected on the display section 30 so as to notify the receiver of the fact that the relay unit data stored in the memory 36 of the relay unit 14-1 is in an error condition (Step S8). This display includes the indication of an error in the transferred data as well the unit number of the relevant relay unit. If the display section consists of printer, the indication may include the indication of the data portion where the data is in discord.

In this embodiment, the relay unit data in the memory 36 of the relay unit 14-1 is compared directly with the original data in the memory 24 of the receiver 10, so an accuracy of the revised relay data is guaranteed.

While in the above embodiment the data checking is effected by reading the data from the relay unit in response to the checking requirement from the receiver 10, the reading and checking of data may also be performed automatically at start up or at periodical checking.

After the building has been completed, there is fundamentally no need for revising the relay unit data. Accordingly, it is desirable that the write-enable access to the memory 36 by the memory control section 48 be unconditionally inhibited so that the memory 36 provided in the relay unit may be prevented from being rewritten as a result of a malfunction or noises under regular monitoring conditions.

In view of this, this embodiment employs, as shown in FIG. 1, a data-write operation section 60 provided on the side of the receiver 10 as well as a data-write inhibiting switch 61 adapted to be operated by the data-write operation section 60 and provided on a write-control line 62 extending between the memory control section 48 and the memory 36 in each relay unit. The reference numeral 63 indicates a read-control line extending between the memory control section 48 and the memory 36. The data-write operation section 60 is connected to the write-inhibiting switches 61 of the respective relay units through a signal line 70.

With this construction, the write-inhibiting switch 61 is normally open, retaining the memory 36 in the write-inhibit condition. When rewriting the relay unit data, the write-inhibiting switch 61 is closed through manipulation of the data-write operation section 60, thereby setting the memory in the condition which allows writing. Instead of providing the data-write operation section on the side of the receiver 10, a manually operable write-inhibiting switch may be provided on the write-control line 62. In that case, it is necessary to go to the relay unit concerned and manually operate the write-inhibiting switch. While the memory provided in the relay unit is an EEPROM in the above-described embodiment, it may also be an RAM having a battery back-up function.

Figure 4:
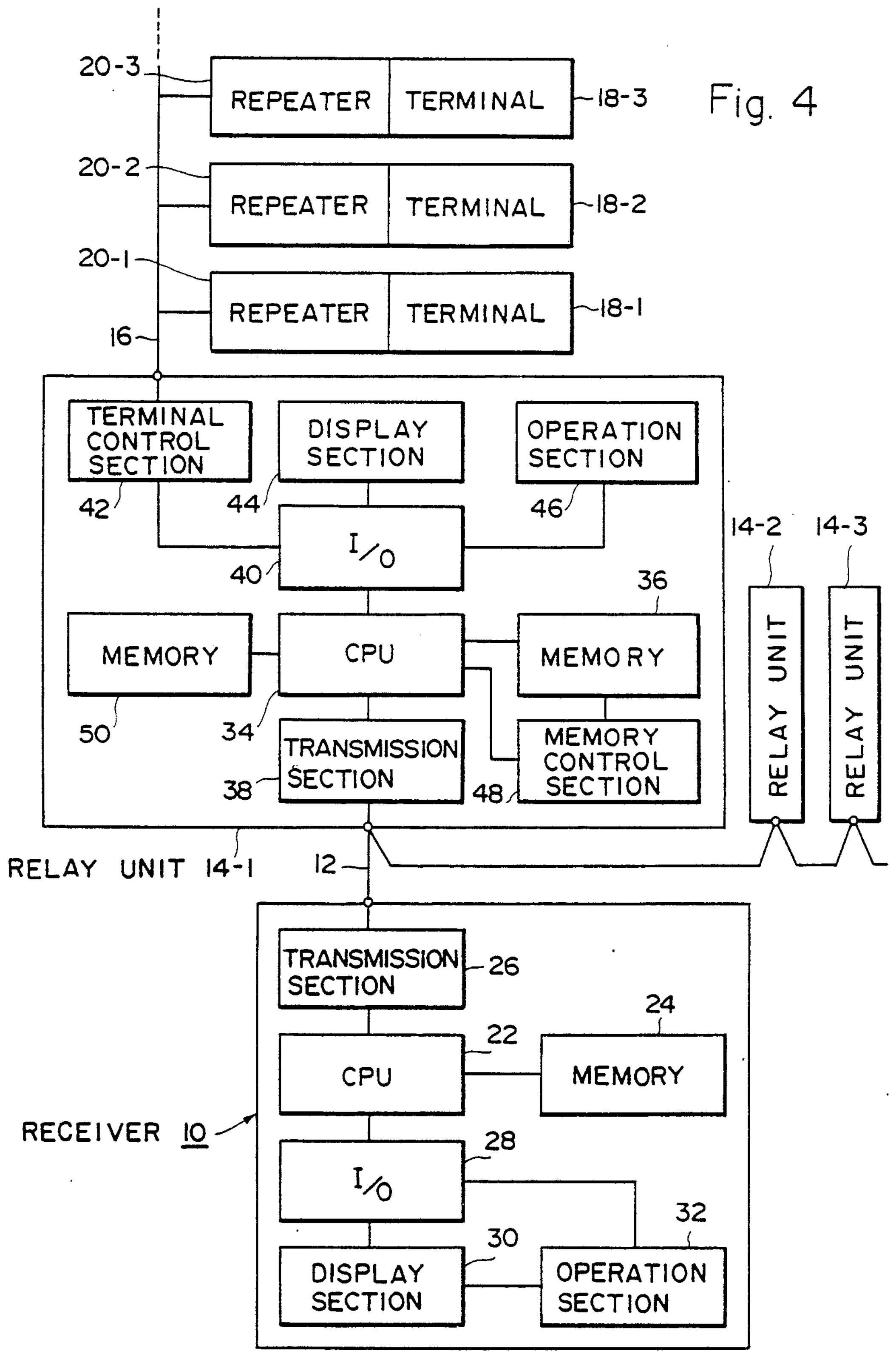
FIG. 4 is a block diagram showing another embodiment of this invention.

While in the above embodiment the data checking is effected by transferring the relay unit data from the memory 36 of the relay unit to the receiver 10 and collating it with the original data to see whether it is in accordance therewith, it is also possible to perform the data checking on the side of the relay units 14-1, 14-2, 14-3, . . . , as in another embodiment of this invention, shown in FIG. 4 and described below.

This second embodiment has substantially the same construction as the first one shown in FIG. 1. It only differs therefrom in that the CPU 34 of each of the relay units 14-1, 14-2, 14-3, . . . is equipped with a memory 50 for performing the data checking operation.

Figure 5:
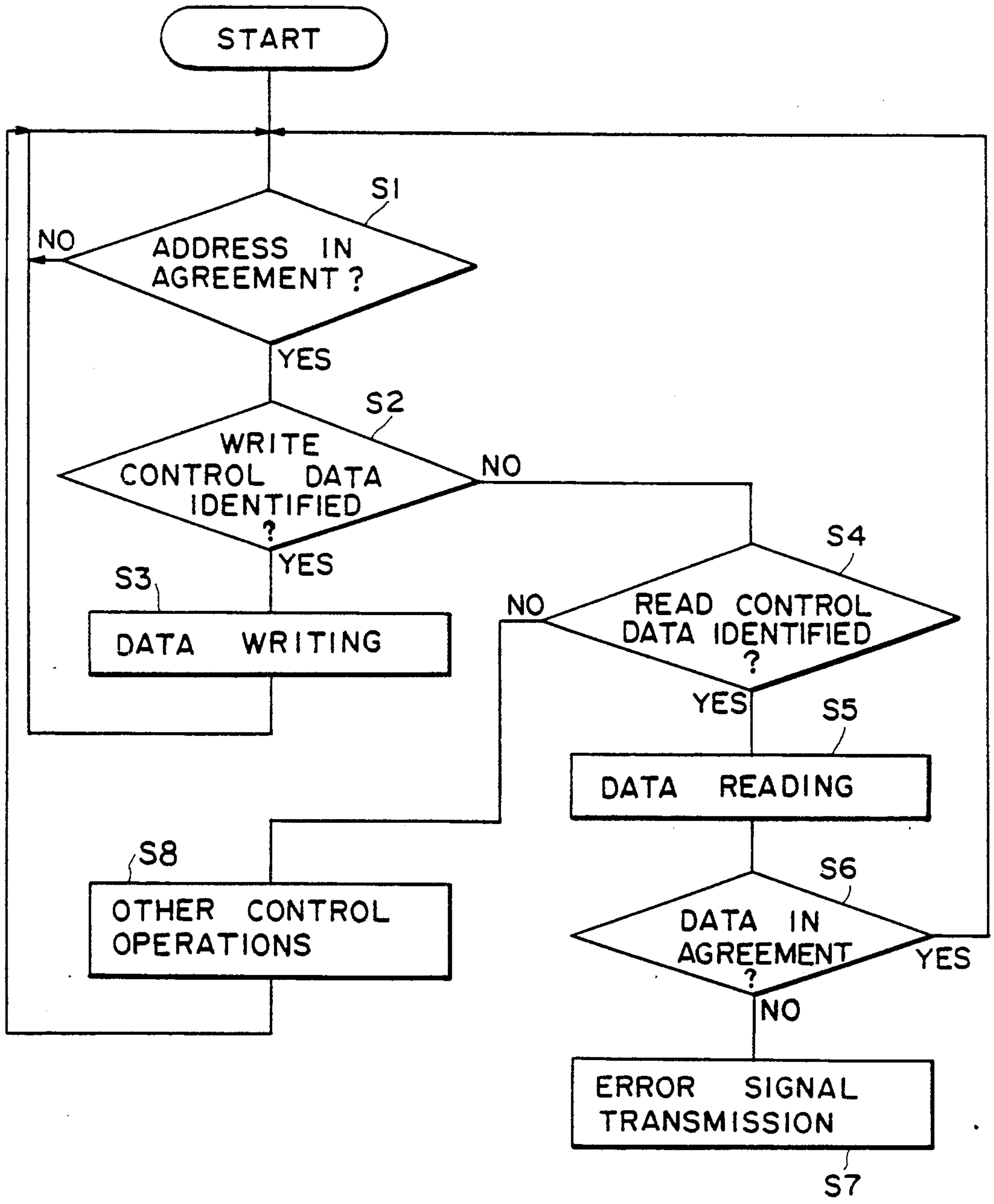
FIG. 5 is a flowchart illustrating the processing operations in the embodiment shown in FIG. 4.

The operation of writing relay unit data to the memory 36 as well as the data checking operation performed by the relay units in accordance with the second embodiment will now be described with reference to the flowchart of FIG. 5.

First, the relay unit data stored in the memory 24 of the receiver 10 is written to the respective memories 36 of the relay units 14-1, 14-2, 14-3, . . . The CPU 34 of each relay unit then checks the transferred data to see whether it contains its address (Step S1), and, if it identifies therein its address and the write-control signal for the relay unit data (Step S2), it sets the memory 36 in the condition which allows writing, the data transferred afterwards consecutively being written to the memory 36 (Step S3).

When the receiver 10 has performed the data checking operation, the original data previously stored in the memory 24 is transferred to a predetermined relay unit among 14-1, 14-2, 14-3, . . . The data thus transferred is stored in the memory 50. And now, it is capable of including the original data in the signal of the receiver 10.

Each of the relay units 14-1, 14-2, 14-3, . . . checks the signal transmitted thereto from the receiver 10, and, if it identifies therein its address and the read-control signal (Step S4), the associated memory 36 is set in the condition which allows reading, the relay data previously written thereto being read (Step S5), and the data thus read being checked by being collated with the original data stored in the memory 50 (Step S6). If the data transmitted from the receiver 10 is not the write-control signal and the read-control signal but the data for commanding the relay unit 14-1, 14-2, 14-3, . . . to monitor the equipment 18-1,18-2,18-3, . . . the relay unit 14-1, 14-2, 14-3, . . . . control the equipment 18-1,18-2,18-3, . . . on the basis of the data (step S8).

If the data read is in accordance with the original data, the operation on the side of the receiver 10 is waited for. If the data read is found to be in discordance with the original data, an error signal is transmitted to the receiver 10 (Step S7), to notify it of the error condition of the data. If the receiver 10 receives an error signal, it effects an error display on the display section 30, as in the embodiment shown in FIG. 1.

After effecting the display, the receiver 10 performs a writing operation and transmits a write signal to the relay units. This causes the respective memories 36 of the relay units 14-1, 14-2, 14-3, . . . to be rewritten. Afterwards, the receiver 10 repeats the data checking operation. While in the embodiment shown in FIG. 1 the relay unit data transmitted from the receiver 10 to the relay units 14-1, 14-2, 14-3, . . . has to be transferred to the receiver 10, which means the data is passed through the transmission lines 12 twice, it is enough in this embodiment for the relay unit data written to the memory 36 and that data written to the memory 50 to pass the transmission lines 12 only once, thereby avoiding any destruction of the data being transmitted as far as possible.

This embodiment may also be equipped with a write-inhibit switch, as in the embodiment shown in FIG. 1.

If, in either embodiment, a fire is detected during periodical data checking, the operation of data checking is immediately stopped, performing the necessary control to cope with the fire.

We claim:

1. A monitoring apparatus for disaster prevention comprising:

one or a plurality of relay units equipped with a storage means allowing rewriting of data and a control section for monitoring a plurality of terminals with equipment on the basis of data stored in said storage means;

a receiver connected to said relay units over transmission lines and adapted to monitor and control said relay units by transmitting information based on data stored in the storage means of said relay units;

data transfer/writing means for taking relay unit data previously stored in a storage means of said receiver and transferring and writing it to the storage means of said relay units over the transmission lines; and a data checking means for reading the data written to the storage means of said relay units by said data transfer/writing means and transmitting it through the transmission lines to said receiver and collating to see whether the realy unit data previously stored in the storage means of said means is in accordance with the data written to the storage means of said relay units, whereby when said transferred data from the relay unit is not in accordance with the relay unit data previously stored in a storage means of said receiver, the number of data collating operations performed is counted, and if the number does not exceed a predetermined value, then repeat the transfer/writing procedure for taking the relay unit data previously stored in a storage means of said receiver and transferring and writing it to the storage means of said relay units by said data transfer/writing means; and a checking procedure by said data checking means are repeated until the number exceeds a predetermined value, and whenever the transferred data is not in accordance with said relay unit data even after repeating said procedure until the number exceeds a predetermined value, a display means located at said receiver indicates any error in the data written to the storage means of said relay units.

2. A monitoring apparatus for disaster prevention as claimed in claim 1, wherein said receiver is equipped with a display means for indicating any error in the data written to the storage means of said relay units whenever said data checking means finds any discordance in the data.

3. A monitoring apparatus for disaster prevention as claimed in claim 1, further comprising a write-inhibiting switch for inhibiting data-writing to the storage means of said relay units.

4. A monitoring apparatus for disaster prevention as claimed in claim 3, wherein said write-inhibiting switch is operated remotely by means of an operation means provided in said receiver.

5. A monitoring apparatus for disaster prevention as claimed in claim 3, wherein said writer-inhibiting switch is operated remotely by means of an operation means provided in said relay unit.

6. A monitoring apparatus for disaster prevention, comprising:

one or a plurality of relay units equipped with a storage means allowing rewriting of data and a control section for monitoring a plurality of terminals with equipment on the basis of data stored in said storage means;

a receiver connected to said relay units over transmission lines and adapted to monitor and control said relay units by transmitting information based on data stored in the storage means of said relay units;

data transfer/writing means for taking relay unit data previously stored in a storage means of said receiver and transferring and writing it to the storage means of said relay units over the transmission lines;

a write-inhibiting switch for inhibiting data writing to the storage means of said relay units which is operated remotely by means of an operating means provided in said relay units;

display means for indicating any error in the data written to the storage means of said relay units whenever said data checking means finds any discordance in the data;

a data checking means for reading the data written to the storage means of said relay units by said data transfer/writing means and transmitting it through the transmission lines to said receiver and collating to see whether the relay unit data previously stored in the storage means of said receiver is in accordance with the data written to the storage means of said relay units;

whereby when said transferred data from the relay unit is not in accordance with the relay unit data previously stored in a storage means of said receiver, the number of data collating operations performed is counted, and if the number does not exceed a predetermined value, then repeat the transfer/writing procedure for taking the relay unit data previously stored in a storage means of said receiver and transferring and writing said data to the storage means of said relay units by said data transfer/writing means; and a checking procedure by said data checking means is repeated until the number exceeds a predetermined value, and whenever the transferred data is not in accordance with said relay unit data after repeating said procedure until the number exceeds a predetermined value, said display means located at said receiver indicates an error in the data written to the storage means of said relay units.

* * * * *